United States Patent
Zhang et al.

(10) Patent No.: US 12,511,563 B2
(45) Date of Patent: Dec. 30, 2025

(54) QUANTUM COMPUTING TASK PROCESSING METHOD AND SYSTEM AND COMPUTER DEVICE

(71) Applicants: TENCENT TECHNOLOGY (SHENZHEN) COMPANY LIMITED, Shenzhen (CN); Tsinghua University, Beijing (CN)

(72) Inventors: Shixin Zhang, Shenzhen (CN); Shengyu Zhang, Shenzhen (CN); Hong Yao, Shenzhen (CN)

(73) Assignees: TENCENT TECHNOLOGY (SHENZHEN) COMPANY LIMITED, Shenzhen (CN); Tsinghua University, Beijing (CN)

( * ) Notice: Subject to any disclaimer, the term of this patent is extended or adjusted under 35 U.S.C. 154(b) by 626 days.

(21) Appl. No.: 17/993,660

(22) Filed: Nov. 23, 2022

(65) Prior Publication Data
US 2023/0144633 A1     May 11, 2023

Related U.S. Application Data

(63) Continuation of application No. PCT/CN2021/140898, filed on Dec. 23, 2021.

(30) Foreign Application Priority Data

Nov. 9, 2021    (CN) .................... 202111320796.5

(51) Int. Cl.
G06N 10/20     (2022.01)
G06N 10/40     (2022.01)
G06N 10/60     (2022.01)

(52) U.S. Cl.
CPC ............ *G06N 10/20* (2022.01); *G06N 10/40* (2022.01); *G06N 10/60* (2022.01)

(58) Field of Classification Search
None
See application file for complete search history.

(56) References Cited

U.S. PATENT DOCUMENTS

| | | | | | |
|---|---|---|---|---|---|
| 2014/0187427 | A1* | 7/2014 | Macready | ............... | G06N 7/01 706/46 |
| 2014/0344322 | A1* | 11/2014 | Ranjbar | ............... | B82Y 10/00 708/270 |

(Continued)

FOREIGN PATENT DOCUMENTS

| CN | 111162886 A | * | 5/2020 | .......... | H04L 5/0008 |
|---|---|---|---|---|---|
| CN | 112272085 A | | 1/2021 | | |

(Continued)

OTHER PUBLICATIONS

The European Patent Office (EPO) The Extended European Search Report for 21936248.0 Nov. 3, 2023 10 Pages.

(Continued)

*Primary Examiner* — Haimei Jiang
(74) *Attorney, Agent, or Firm* — Anova Law Group, PLLC

(57) ABSTRACT

A quantum computing task processing method includes: performing transformation processing on input quantum states of n+m qubits through a parameterized quantum circuit, the n+m qubits including n task bits and m auxiliary bits; measuring output quantum states of the n+m qubits to obtain a bit string of the n+m qubits; updating parameters of the parameterized quantum circuit based on output quantum states of the n task bits when an auxiliary substring satisfies a post-selection condition and the parameterized quantum circuit has not converged, the auxiliary substring being a substring corresponding to the m auxiliary bits in the bit string; and obtaining a computing result of the target quantum computing task based on the output quantum states of (Continued)

the n task bits when the auxiliary substring satisfies the post-selection condition and the circuit has converged.

20 Claims, 6 Drawing Sheets

(56) References Cited

U.S. PATENT DOCUMENTS

| | | | |
|---|---|---|---|
| 2015/0188701 A1* | 7/2015 | Nordholt | H04L 63/061 |
| | | | 713/171 |
| 2020/0057957 A1 | 2/2020 | Johnson et al. | |
| 2020/0104740 A1* | 4/2020 | Cao | G06N 10/60 |
| 2021/0126652 A1* | 4/2021 | Delfosse | H03M 13/136 |
| 2021/0241150 A1 | 8/2021 | Tilly et al. | |
| 2021/0264309 A1* | 8/2021 | Wang | G06F 30/20 |
| 2023/0040289 A1* | 2/2023 | Sels | G06N 7/01 |
| 2023/0297745 A1* | 9/2023 | Li | G06N 10/20 |
| | | | 703/6 |
| 2023/0409374 A1* | 12/2023 | Ide | G06N 7/01 |
| 2024/0029911 A1* | 1/2024 | Lukin | G21K 1/003 |

FOREIGN PATENT DOCUMENTS

| | | | | |
|---|---|---|---|---|
| CN | 112651509 A | * | 4/2021 | G06N 5/01 |
| CN | 112884153 A | | 6/2021 | |
| CN | 113379057 A | * | 9/2021 | G06N 10/00 |
| CN | 113496285 A | | 10/2021 | |
| CN | 113517040 A | * | 10/2021 | G06N 10/00 |

OTHER PUBLICATIONS

Du, Y., et al. "The expressive power of parameterized quantum circuits. arXiv 2018." arXiv preprint arXiv:1810.11922. 15 pages.
Cao, Yudong, et al. "Quantum chemistry in the age of quantum computing." Chemical reviews 119.19 (2019):10856-10915. 60 pages.
Chen, Ranyiliu, et al. "Variational quantum algorithms for trace distance and fidelity estimation." Quantum Science and Technology 7.1 (2021): 015019. 14 pages.
China National Intellectual Property Administration (CNIPA) Office Action 1 for Application No. 202111320796.5 Sep. 3, 2024 8 Pages (including translation).
The World Intellectual Property Organization (WIPO) International Search Report for PCT/CN2021/140898 Aug. 1, 2022 8 Pages (including translation).
John Preskill, "Quantum Computing in the NISQ era and beyond", Jul. 31, 2018, Quantum.
Alberto Peruzzo et al., "A variational eigenvalue solver on a Photonic quantum processor", Apr. 10, 2013, Commun.
Andrew M. Childs et al., "Hamiltonian Simulation Using Linear Combinations of Unitary Operations", Feb. 27, 2012, Quantum Information and Computation.
Yaodong Li et al., "Quantum Zeno Effect and the Many-body Entanglement Transition," Nov. 19, 2018.
Shixin Zhang et al., "Variational Quantum-Neural Hybrid Eigensolver", Jun. 9, 2021.

* cited by examiner

QUANTUM COMPUTING TASK PROCESSING METHOD AND SYSTEM AND COMPUTER DEVICE

CROSS-REFERENCES TO RELATED APPLICATIONS

This application is a continuation application of PCT Patent Application No. PCT/CN2021/140898, entitled "QUANTUM COMPUTING TASK PROCESSING METHOD AND SYSTEM AND COMPUTER DEVICE" and filed on Dec. 23, 2021, which claims priority to Chinese Patent Application No. 202111320796.5, entitled "QUANTUM COMPUTING TASK PROCESSING METHOD AND SYSTEM AND COMPUTER DEVICE" and filed with the China National Intellectual Property Administration on Nov. 9, 2021, the entire contents of both of which are incorporated herein by reference.

FIELD OF THE TECHNOLOGY

Embodiments of the present disclosure relate to the field of quantum technology, and in particular, to a quantum computing task processing method and system and a computer device.

BACKGROUND OF THE DISCLOSURE

A variational quantum algorithm is an algorithm that uses a quantum computer to calculate a cost function, and adjusts parameters according to a value of the cost function through a classical computer until the cost function is minimized.

The variational quantum algorithm relies on a parameterized quantum circuit (PQC) to be implemented. In a variational task in the related art, a quantum system with the same physical qubit scale is usually simulated by including a PQC with a specific quantity of bits.

However, considering the influence of noise and the decoherence of the quantum system, a depth of the PQC is limited to a certain extent, resulting in insufficient expression capability of the PQC for the variational task and affecting the execution effect of the variational task.

SUMMARY

Embodiments of the present disclosure provide a quantum computing task processing method and system, and a computer device, which can improve the expression capability of a parameterized quantum circuit (PQC) of a variational task and improve the execution effect of the variational task. The technical solutions are as follows:

According to an aspect of this embodiment of the present disclosure, a quantum computing task processing method, performed by a computer device, the computer device being a hybrid computer device including a classical computer and a quantum computer; and the method including: performing transformation processing on input quantum states of n+m qubits through a parameterized quantum circuit corresponding to a target quantum computing task, the n+m qubits comprising n task bits and m auxiliary bits, and n and m being positive integers; measuring output quantum states of the n+m qubits to obtain a bit string of the n+m qubits; updating parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and obtaining a computing result of the target quantum computing task based on the output quantum states of the n task bits when the auxiliary substring in the bit string satisfies the post-selection condition and the parameterized quantum circuit has converged.

According to another aspect of this embodiment of the present disclosure, a quantum computing task processing system is provided, including: a transformation processing module, a measurement module, an optimizer, and a task processing module; the transformation processing module being configured to perform transformation processing on input quantum states of n+m qubits through a parameterized quantum circuit corresponding to a target quantum computing task, the n+m qubits including n task bits and m auxiliary bits, and n and m being positive integers; the measurement module being configured to measure output quantum states of the n+m qubits to obtain a bit string of the n+m qubits; the optimizer being configured to update parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and the task processing module being configured to obtain a computing result of the target quantum computing task based on the output quantum states of the n task bits when the auxiliary substring in the bit string satisfies a post-selection condition and the parameterized quantum circuit has converged.

According to an aspect of this embodiment of the present disclosure, a computer device is provided, the computer device being a hybrid computer device including a classical computer and a quantum computer; and the computer device being configured to perform the quantum computing task processing method as described above.

According to an aspect of this embodiment of the present disclosure, a hybrid computer system, including a quantum computing device including a parameterized quantum circuit, a control device, and a classical computer, the control device being configured to control the quantum computing device to execute the parameterized quantum circuit corresponding to a target quantum computing task, so as to perform transformation processing on input quantum states of n+m qubits, the n+m qubits including n task bits and m auxiliary bits, and n and m being positive integers; the control device being configured to measure output quantum states of the n+m qubits to obtain a bit string of the n+m qubits; the classical computer being configured to update parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and the classical computer being further configured to obtain a computing result of the target quantum computing task based on the output quantum states of the n task bits when the auxiliary substring in the bit string satisfies a post-selection condition and the parameterized quantum circuit has converged.

According to an aspect of this embodiment of the present disclosure, one or more non-transitory computer-readable storage media is provided, storing one or more computer programs, the one or more computer programs being executed by a computer device, and causing the computer device to implement the foregoing method.

The technical solutions provided in the embodiments of the present disclosure include at least the following beneficial effects:

For the PQC corresponding to the variational task, the m auxiliary bits are added based on the n task bits. During processing the variational task, by performing a post-selection on a measurement result of the output quantum states of the m auxiliary bits, the output quantum states that satisfy a condition on the n task bits are selected to update the PQC or obtain a task result; and that is, the foregoing solution may simulate a quantum system with a physical qubit scale of n by using the m+n qubits, which improves the simulation effect of the PQC on the quantum system, thereby improving the expression capability of the PQC of the variational task, and further improving the execution effect of the variational task.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from the accompanying drawings without creative efforts.

DESCRIPTION OF EMBODIMENTS

Figure 1:
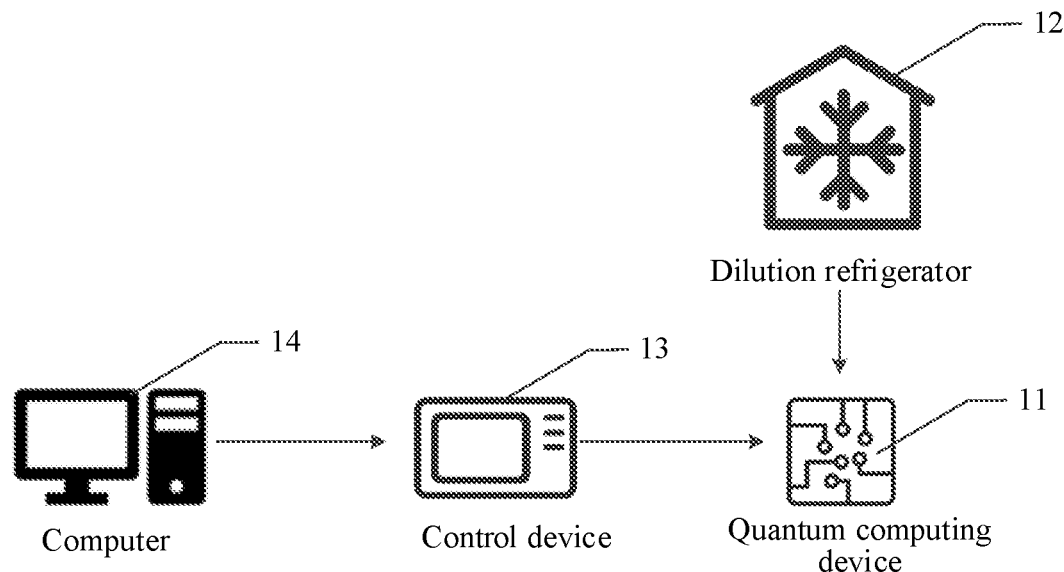
FIG. 1 is a schematic diagram of an application scenario of a solution according to an embodiment of the present disclosure.

To make the objectives, technical solutions, and advantages of the present disclosure clearer, the following further describes implementations of the present disclosure in detail with reference to the accompanying drawings.

Before embodiments of the present disclosure are described, some terms involved in the present disclosure are explained first.

1) Quantum computation (QC): Based on quantum logic, QC is a computing manner of using properties such as superposition and entanglement of quantum states to rapidly complete a computation task. A basic unit of data storage in quantum computing is a qubit.

2) Quantum bit (Qubit): Qubits are a form of carrying quantum information and also a basic unit of quantum computing. A conventional computer uses 0 and 1 as basic units of binary. A difference is that the quantum computing may simultaneously process 0 and 1, and the system may be in a linear superposition state of 0 and 1: $|\psi\rangle +\alpha|0\rangle +\beta|1\rangle$, where $\alpha$, $\beta$ represents a complex probability amplitude of the system on 0 and 1. Their modulo squares $|\alpha|^2$, $|\beta|^2$ respectively represent probability of being at 0 and 1.

3) Quantum operation: A quantum operation refers to perform manipulation on the qubits to process the quantum information carried by the qubits. Common quantum operations include Pauli X, Y, Z transformation (or written as $\sigma_x$, $\sigma_y$, $\sigma_z$), Hadamard transformation (H), controlled Pauli X transformation, that is, a controlled-NOT gate CNOT, or the like. Only a single bit operation and a two-bit operation may be used to complete any quantum computation, and are abbreviated as operations at some positions below.

4) Quantum circuit: A quantum circuit is a description model of the quantum computation, including the qubits and the quantum operations on the qubits, and representing a hardware implementation of the corresponding quantum algorithm/program under a quantum gate model. The quantum circuit includes a sequence of quantum gates, and computation is performed by the quantum gates. If the quantum circuit includes adjustable parameters that control the quantum gate, the quantum circuit is referred to as a parameterized quantum circuit.

5) Quantum computing device: A quantum computing device is a physical device that performs the quantum computation.

6) Hamiltonian: Hamiltonian is a Hermitian conjugate matrix describing total energy of a quantum system. The Hamiltonian is a physical word and an operator that describes total energy of a system, which is denoted by H.

7) Eigenstate: For a Hamiltonian matrix H, a solution that satisfies an equation $H|\psi\rangle =E|\psi\rangle$ is referred to as eigenstate $|\psi\rangle$ of H, and has eigenenergy E. A ground state corresponds to the eigenstate with the lowest quantum system energy.

8) Quantum-classical hybrid computing: Quantum-classical hybrid computing is an inner layer that calculates the corresponding physical quantity or loss function by using a PQC. A computing paradigm in which variational parameters of the quantum circuit are adjusted by a conventional classical optimizer in an outer layer may maximize advantages of small-scale quantum hardware quantum computing, and is believed to be one of the important directions that has the potential to prove quantum advantage.

9) Noisy intermediate-scale quantum (NISQ) in the near future: Noisy intermediate-scale quantum in the near future is a current stage of quantum computing development and a key direction of research. At this stage, quantum computing cannot be used as an engine for general-purpose computing due to limitations of scale and noise. However, in some problems, results that surpass the most advanced classical computer have been achieved, which is often referred to as quantum supremacy or quantum advantage.

10) Variational quantum eigensolver (VQE): Estimation of ground state energy of a given quantum system is implemented through a variational circuit. A variational quantum eigensolver is a typical quantum-classical hybrid computing paradigm and has a wide range of applications in the field of quantum chemistry.

11) Post-selection: For a measurement result outputted by a quantum computer, based on a specific value of a bit string (also referred to as a classical bit string) corresponding to some bits, a measurement result is selected to be retained or discarded, which is referred to as post-selection. The post-selection appears in many current research hotspots, which include, but are not limited to the implementation of linear combinations of unitary (LCU), measurement-induced entanglement entropy phase transition, or the like.

12) Pauli string: An item includes a direct product of a plurality of Pauli matrices at different grids. A general Hamiltonian may usually be decomposed into a sum of a set of Pauli strings. The measurement of VQE is also generally measured item by item according to the decomposition of the Pauli string.

13) Non-unitary: A so-called unitary matrix is all matrices that satisfy $U^{\dagger} U=I$, and all evolution processes directly allowed by quantum mechanics may be described by the unitary matrix. Matrices that do not satisfy the condition are non-unitary, which may only be implemented experimentally through auxiliary means or even exponentially more resources, but non-unitary matrices often have stronger expression capability and faster ground-state projection effects.

14) Classic bit string: A classic bit string is a string of numbers including 0 and 1. A classical result obtained by each measurement of the quantum circuit may be respectively represented by 0 and 1 according to the upper and lower spin configurations on a measurement basis, so that a total result of one measurement corresponds to a bit string.

15) Pauli matrix: Three commonly used 2*2 Hermitian matrices (also referred to as unitary matrices) in quantum mechanics, also referred to as Pauli operators, are generally represented by the Greek letter σ (Sigma). A Pauli X operator is $$\sigma_x = \begin{bmatrix} 0 & 1 \\ 1 & 0 \end{bmatrix},$$

a Pauli Y operator is $$\sigma_y = \begin{bmatrix} 0 & -i \\ i & 0 \end{bmatrix},$$

and a Pauli Z operator is $$\sigma_z = \begin{bmatrix} 1 & 0 \\ 0 & -1 \end{bmatrix}.$$

FIG. 1 is a schematic diagram of an application scenario of a solution according to an embodiment of the present disclosure. As shown in FIG. 1, the application scenario may be a superconducting quantum computing platform, and the application scenario includes: a quantum computing device 11, a dilution refrigerator 12, a control device 13, and a computer 14.

The quantum computing device 11 is a circuit that is applied on a physical qubit, and the quantum computing device 11 may be implemented as a quantum chip, such as a superconducting quantum chip close to absolute zero. The quantum computing device 11 may include/execute a parameterized quantum circuit. The dilution refrigerator 12 is configured to provide an absolute zero environment for the superconducting quantum chip. The computer 14 may be a classical computer.

The control device 13 is configured to control the quantum computing device 11, and the computer 14 is configured to control the control device 13. For example, a written quantum program is compiled into instructions by software in the computer 14 and transmitted to the control device 13 (such as an electronic/microwave control system). The control device 13 converts the instructions into an electronic/microwave control signal and inputs the instructions to the dilution refrigerator 12 to control a superconducting qubit at a temperature of lower than 10 mK. A process of reading is reversed, and a read waveform is delivered to the control device 13.

Before the method embodiment of the present disclosure is described, a running environment of the method is described first. The method provided in this embodiment of the present disclosure may be performed in a hybrid device environment of a classical computer and a quantum computer.

In the following method embodiment, for ease of description, the description is provided by merely using a computer device as the execution entity of the steps. It is to be understood that the computer device may include a hybrid execution environment including a classical computer and a quantum computer. This is not limited in the embodiments of the present disclosure.

Figure 2:
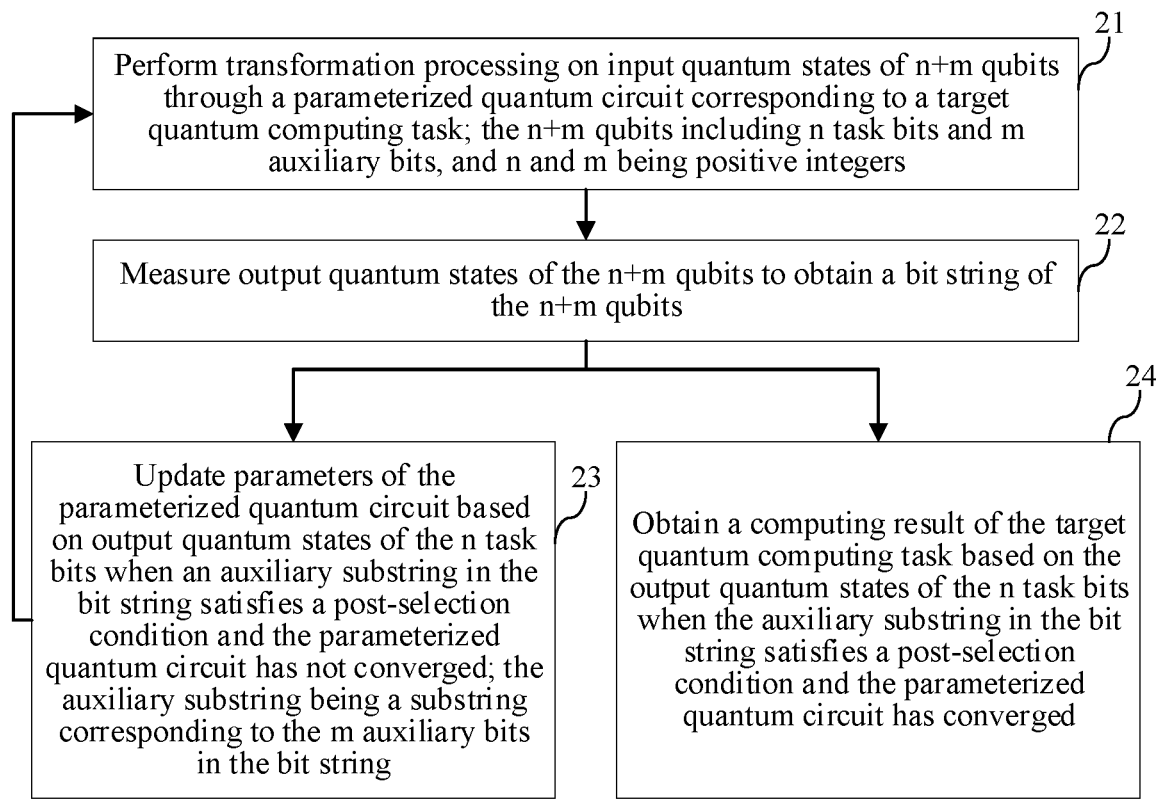
FIG. 2 is a flowchart of a quantum computing task processing method according to an embodiment of the present disclosure.

FIG. 2 is a flowchart of a quantum computing task processing method according to an embodiment of the present disclosure. An execution entity of each step of the method may be a computer device. The computer device may be a hybrid computer device including a classical computer and a quantum computer. The method may include the following steps:

Step 21. Perform transformation processing on input quantum states of n+m qubits through a parameterized quantum circuit corresponding to a target quantum computing task, the n+m qubits including n task bits and m auxiliary bits, and n and m being positive integers.

In this embodiment of the present disclosure, the parameterized quantum circuit includes a quantum gate with parameters, and the parameters of the quantum gate with parameters may be adjusted in a process of performing the target quantum computing task.

The parameterized quantum circuit includes n+m qubits, and a quantum gate in the parameterized quantum circuit is applied on the n+m qubits.

The n task bits are qubits used for performing a target quantum computing task, and are used for simulating a quantum system including n qubits; and the m auxiliary bits are used for expanding the expression capability of the parameterized quantum circuit PQC in simulating the quantum system.

The performing transformation processing on the input quantum states of the n+m qubits through a parameterized quantum circuit corresponding to the target quantum computing task may refer to inputting the input quantum states in a quantum system including physical qubits in the quantum computing device. Then, through a measurement and control system, a quantum operation corresponding to the quantum gate in the parameterized quantum circuit is performed on the quantum system, thereby transforming the quantum state on the corresponding physical qubit.

Step 22. Measure output quantum states of the n+m qubits to obtain a bit string of the n+m qubits.

After completing one round of execution of the parameterized quantum circuit, the computer device may measure the quantum state of each of the physical qubits in the quantum system through the measurement and control system to obtain bit strings corresponding to the n+m qubits.

Step 23. Update parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string.

Step 24. Obtain a computing result of the target quantum computing task based on the output quantum states of the n task bits when the auxiliary substring in the bit string satisfies the post-selection condition and the parameterized quantum circuit has converged.

In this embodiment of the present disclosure, the bit strings corresponding to the n+m qubits include sub-bit strings corresponding to the n task bits and sub-bit strings corresponding to the m auxiliary bits, where the sub-bit strings corresponding to the m auxiliary bits are used for performing a post-selection operation.

That is, if the strings corresponding to the m auxiliary bits in the bit string satisfies a post-selection condition, the computer device considers that in this measurement, the quantum states corresponding to the n task bits satisfy a task execution condition and may be used for performing subsequent target quantum computing tasks; and in some embodiments, if the strings corresponding to the m auxiliary bits in the bit string do not satisfy a post-selection condition, the computer device considers that in this measurement, the quantum states corresponding to the n task bits do not satisfy a task execution condition and may exclude the measurement result.

Figure 3:
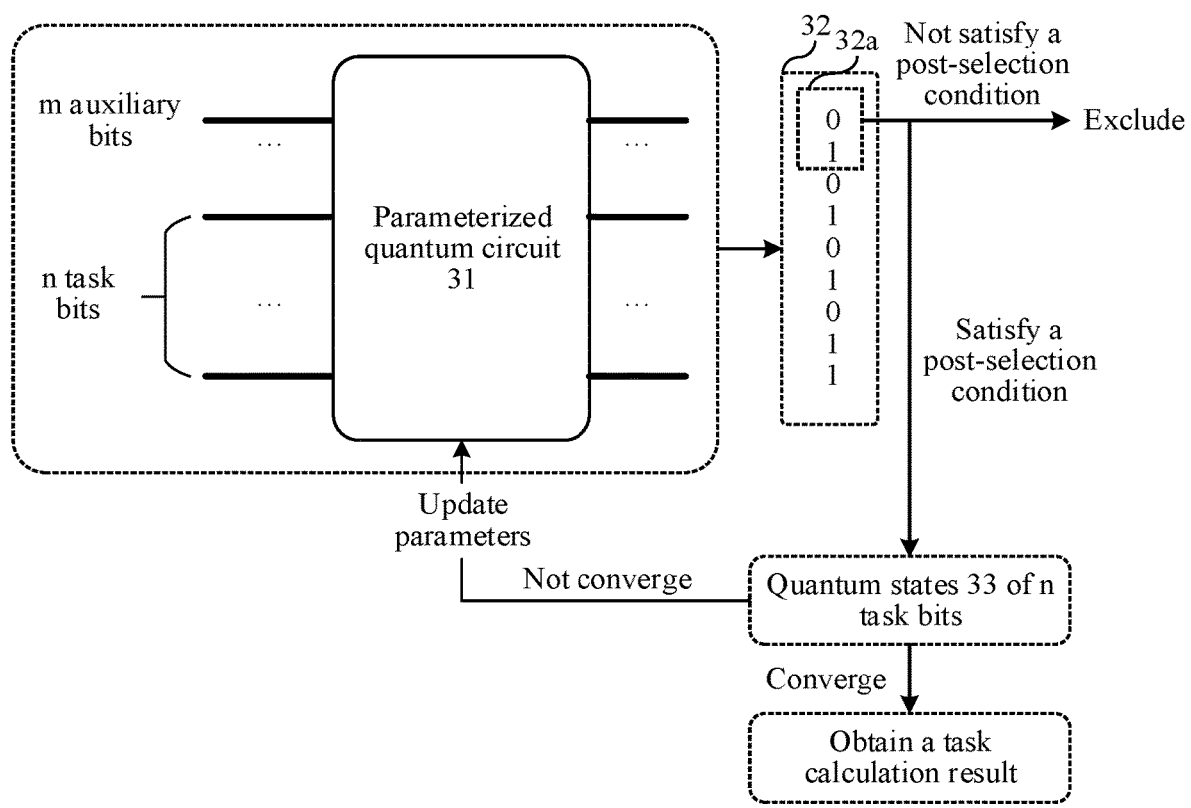
FIG. 3 is a frame diagram of processing a quantum computing task involved in the embodiment shown in FIG. 2.

FIG. 3 is a frame diagram of quantum computing task processing involved in the embodiment of the present disclosure. As shown in FIG. 3, after executing the parameterized quantum circuit 31 on the quantum computer device, the computer device measures the parameterized quantum circuit 31 to obtain a bit string 32, where the bit string 32 includes substrings 32a corresponding to the m auxiliary bits, and the substrings 32a are the auxiliary substrings; if the substrings 32a do not satisfy the post-selection condition, the computer device excludes the measurement result; if the substrings 32a satisfy the post-selection condition, the computer device obtains the quantum states 33 of the n task bits corresponding to the measurement result; if the parameterized quantum circuit 31 has not converged in this case, the computer device updates parameters of the parameterized quantum circuit 31 according to the quantum states 33 of the n task bits; and if the parameterized quantum circuit 31 has converged in this case, the computer device obtains a computing result of the target quantum computing task according to the quantum states 33 of the n task bits.

In summary, through the solutions shown in this embodiment of the present disclosure, for the PQC corresponding to the variational task, the m auxiliary bits are added based on the n task bits. During processing the variational task, by performing post-selection on a measurement result of the output quantum states of the m auxiliary bits, the output quantum states that satisfy a condition on the n task bits are selected to update the PQC or obtain a task result; and that is, the foregoing solution may simulate a quantum system with a physical qubit scale of n by using the m+n qubits, which improves the simulation effect of the PQC on the quantum system, thereby improving the expression capability of the PQC of the variational task, and further improving the execution effect of the variational task.

In the NISQ era, typical disadvantages of quantum hardware are short coherence time and large quantum noise. However, through an enhancement solution of a variational post-selection proposed in various embodiments of the present disclosure, characteristics of the quantum hardware in the NISQ era are fully considered. The solutions proposed in the various embodiments of the present disclosure are perfectly compatible with other variational post-processing solutions, such as variational quantum neural network hybrid eigensolver (VQNHE), or the like, and may be used in combination to further improve the VQE effect. The solutions shown in the various embodiments of the present disclosure may lay a foundation for demonstrating effective quantum advantages on NISQ hardware, and increase the possibility of commercial application of quantum computers.

The solutions shown in the various embodiments of the present disclosure may be easily applicable to scientific research on quantum hardware evaluation and testing and practical production. Applications include simulating and solving a ground state of the Hamiltonian of systems from problems in condensed matter physics and quantum chemistry. After the scale of the quantum computers is further expanded, more efficient variational tasks such as VQE are also expected to play a practical role in drug design, macromolecular simulation, and new material screening, such as approximating a ground state of chemical macromolecules, or estimating physicochemical properties of a complex system.

Figure 4:
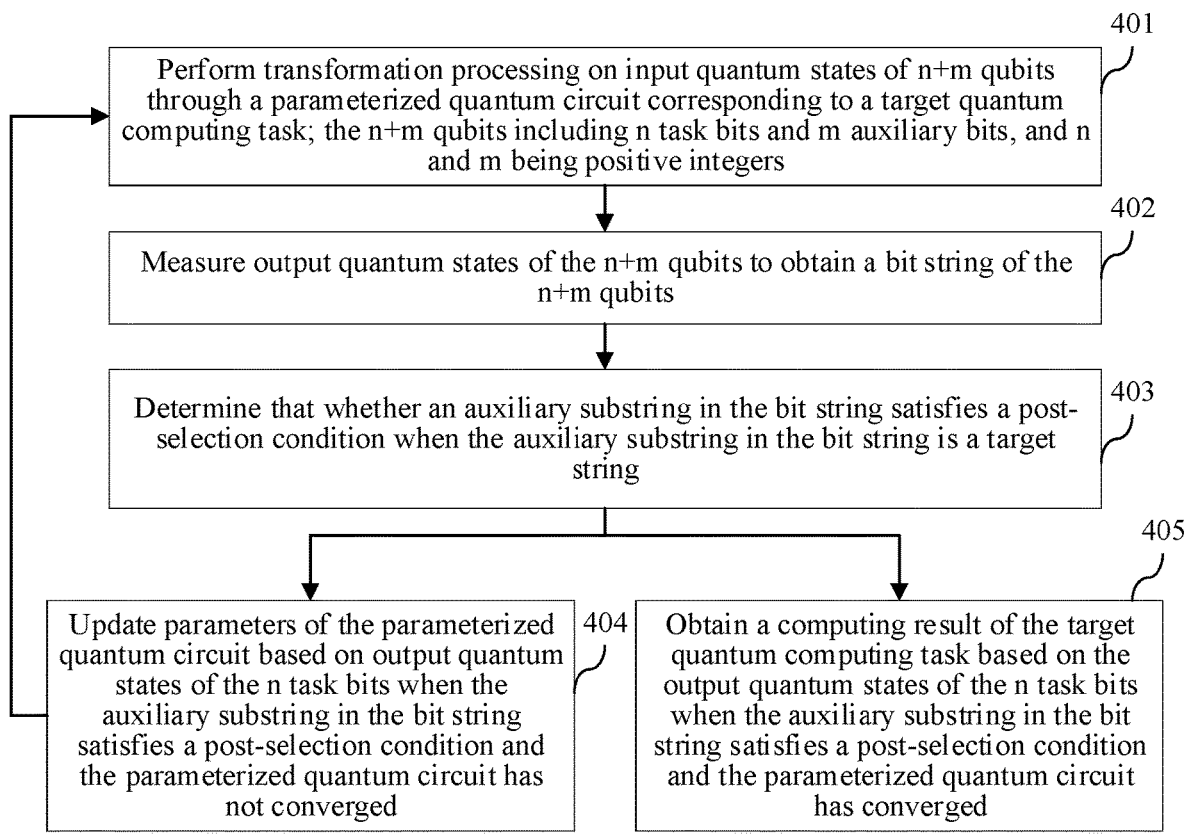
FIG. 4 is a flowchart of a quantum computing task processing method according to an embodiment of the present disclosure.

FIG. 4 is a flowchart of a quantum computing task processing method according to an embodiment of the present disclosure. An execution entity of each step of the method may be a computer device. As shown in FIG. 4, the method may include the following steps:

Step 401. Perform transformation processing on input quantum states of n+m qubits through a parameterized quantum circuit corresponding to a target quantum computing task, the n+m qubits including n task bits and m auxiliary bits.

In this embodiment of the present disclosure, n and m are positive integers.

In one embodiment, the parameters of the parameterized quantum circuit include parameters for performing variational transformation on quantum states of the n+m qubits.

In this embodiment of the present disclosure, in addition to a parameterized bit gate that performs variational transformation on the n task bits, the parameterized quantum circuit further includes a parameterized bit gate that perform variational transformation on the m auxiliary bits. Therefore, in the variational task, a proper measurement result may be screened out by performing a post-selection operation on substrings corresponding to the m auxiliary bits in the measured bit string.

In one embodiment, the parameterized quantum circuit includes parametric entangling gates between the n task bits and the m auxiliary bits respectively.

Figure 5:
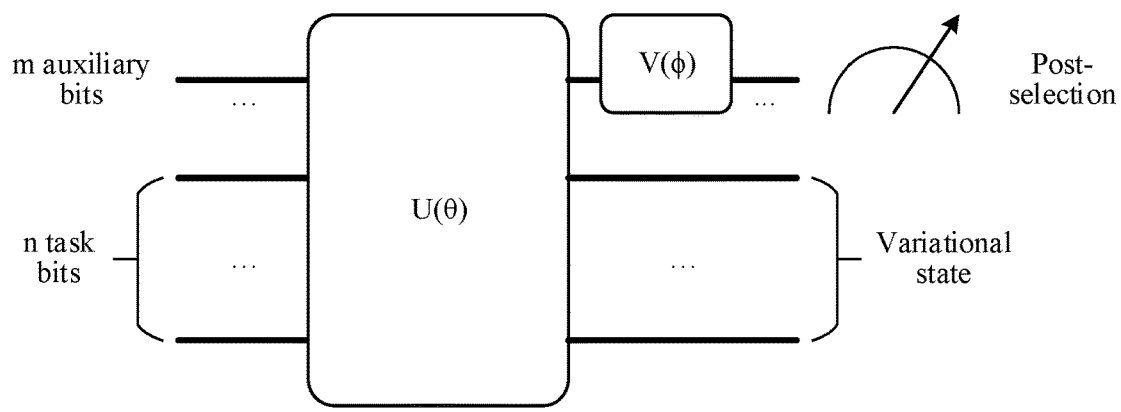
FIG. 5 is a circuit structural frame diagram of a parameterized quantum circuit involved in the embodiment shown in FIG. 4.

FIG. 5 is a frame diagram of a circuit structure of a parameterized quantum circuit involved in the embodiment of the present disclosure. As shown in FIG. 5, in addition to a conventional quantum gate applied on a task bit, a circuit in a U(θ) part of further adds an entanglement gate connecting the task bit and the auxiliary bit. In addition, the parameterized quantum circuit in FIG. 5 performs transformation V(φ) on an auxiliary bit before performing post-selection, which is equivalent to finding the most proper post-selection measurement basis for the auxiliary bit. The θ and φ are parameters of the parameterized quantum circuit. During processing the target quantum computing task, θ and φ may be updated until the parameterized quantum circuit has converged. Through the variational transformation of V, the flexibility of the framework is greatly increased, which is equivalent to automatically trying the best measurement basis and a post-selection result.

Step 402. Measure output quantum states of the n+m qubits to obtain a bit string of the n+m qubits.

Step 403. Determine whether the auxiliary substring in the bit string satisfies the post-selection condition when the auxiliary substring in the bit string is a target string.

In this embodiment of the present disclosure, as shown in FIG. 5, due to the existence of the variational transformation V, it is equivalent to the post-selection measurement basis of automatically finding the most proper auxiliary bit during performing the target quantum computing task. Therefore, in this embodiment of the present disclosure, the post-selected bit string does not need to be specially selected, and only a target string needs to be set at the beginning. Without loss of generality, a string of all 0 may be used as the target string (or a string of all 1, or other combinations of 0 and 1) may be used. In the subsequent target quantum computing tasks, the target string is kept being used as the post-selection condition for the post-selection of the measurement result. When the parameterized quantum circuit has converged, the measurement result that is post-selected through the target string is the accurate measurement result.

Step 404. Update parameters of the parameterized quantum circuit based on output quantum states of the n task bits when an auxiliary substring in the bit string satisfies a post-selection condition and the parameterized quantum circuit has not converged.

Step 405. Obtain a computing result of the target quantum computing task based on the output quantum states of the n task bits when the auxiliary substring in the bit string satisfies the post-selection condition and the parameterized quantum circuit has converged.

In one embodiment, Using the target quantum computing task including a ground state energy solution task as an example, the updating parameters of the parameterized quantum circuit based on output quantum states of the n task bits when an auxiliary substring in the bit string satisfies a post-selection condition and the parameterized quantum circuit has not converged includes:

updating the parameters of the parameterized quantum circuit according to an expected energy value of Hamiltonian of a target quantum system in the output quantum states of the n task bits when the auxiliary substring in the bit string satisfies the post-selection condition and the parameterized quantum circuit has not converged; and correspondingly, the obtaining a computing result of the target quantum computing task based on the output quantum states of the n task bits when the auxiliary substring in the bit string satisfies a post-selection condition and the parameterized quantum circuit has converged includes:

obtaining the expected energy value of the Hamiltonian as ground state energy of the target quantum system when the auxiliary substring in the bit string satisfies the post-selection condition and the parameterized quantum circuit has converged.

In this embodiment of the present disclosure, in the VQE task, an output result may be measured a plurality of times (such as 81921 or 81920 measurements) by constructing a parameterized quantum circuit similar to that in FIG. 5. Through a manner of post-selection, a result that the auxiliary bits in the measurement result are all 0 is retained. Then, an expected energy value of a Pauli string included in the Hamiltonian is estimated through a result of the bit strings on the task bit obtained by measurement to obtain the expected energy value of the Hamiltonian. Subsequently, the parameters θ and φ in the parameterized quantum circuit are updated through the expected energy value of the Hamiltonian, and the process is performed iteratively until the parameterized quantum circuit has converged. The obtained expected energy value of the Hamiltonian is obtained as the ground state energy of the quantum system corresponding to the task bit.

In the solution shown in this embodiment of the present disclosure, the expression capability of the PQC is improved in the variational task is improved by introducing auxiliary bits and through a manner of variational post-selection. Using the VQE task as an example, for a principle of improving the expression capability of the PQC, reference may be made to the subsequent introduction.

First, the comparison of VQE with no auxiliary bit and VQE including auxiliary bits is considered; and then, an output processing manner of the auxiliary bits including the auxiliary bit VQE is analyzed, mainly including two manners such as not performing processing (equivalent to tracing the Hilbert space of the auxiliary bit), and performing post-selection on the measurement result of the auxiliary bits.

For a VQE system with the auxiliary bits, if a basic structure of the PQC is the same, the expression capability of a variational circuit of the VQE system with the auxiliary bits is strictly not less than a variational circuit of the VQE system with no auxiliary bit. That is, if a circuit part on the auxiliary bits is taken as an identity transformation, and the associated quantum gates on the auxiliary bits and the task bits are closed, then the circuit part on the auxiliary bits is reduced back to the VQE system with no auxiliary bit. Therefore, it may be strictly proved that the auxiliary bit VQE on which processing is not performed is stronger than a VQE algorithm of a physical system of a general size.

For the auxiliary bit VQE on which post-processing is not performed, a corresponding wave function is:

$$|\psi\rangle = \sum_{ij} c_{ik}|i\rangle_s|j\rangle_a$$

c is a complex probability amplitude of the wave function, i and j represent bit strings corresponding to a measurement basis, and s and a respectively represent a physical system bit and an auxiliary bit. When the post-selected auxiliary bit corresponds to a specific bit string k, a wave function corresponding to a physical system becomes:

$$|\psi\rangle = \frac{1}{\sqrt{\sum_i |c_{ik}|^2}} \sum_i c_{ik}|i\rangle_s$$

System energy estimation corresponding to the unprocessed auxiliary bits and post-selected auxiliary bits are respectively:

$$\langle H \rangle_\psi = \sum_{ii,j} c^*_{i,j} H_{ii}, c_{ij}$$

$$\langle H \rangle_{\psi_k} = \frac{1}{\sum_i |c_{ik}|^2} \sum_{ii,} c^*_{i,k} H_{i,i} c_{ik}$$

$H_{ii}$, is a matrix element corresponding to a Hamiltonian matrix H. It may be learnt that the energy estimation on which post-processing is not performed may be expressed as an average value of energy estimation for different bit strings on which post-selection is performed, that is:

$$\langle H \rangle_\psi = \sum_j w_j \langle H \rangle_{\psi_j}$$

$w_j = \Sigma_i |c_{ik}|^2$ may be considered as a probability weight due to a normalization requirement $\Sigma_j w_j = 1$ of the wave function.

Since an average value of different post-selected energies is the same as the energy estimation on which post-processing is not performed, there are some post-selected bit strings k corresponding to the task bits whose system energy estimation is smaller than the energy estimation on which post-processing is not performed, which is also the theoretical basis for the introduction of post-selected auxiliary bits to enhance the accuracy of the energy estimation performed by the VQE.

In one embodiment, an input quantum state of the parameterized quantum circuit and a quantum gate in the parameterized quantum circuit have symmetry.

In one embodiment, when the target quantum computing task is a task with a symmetry requirement, the m auxiliary bits include at least two pairs of auxiliary bits, and m is an even number; and a total spin of an output quantum state of each of the at least two pairs of auxiliary bits is zero.

Using the VQE task as an example, for a specific system energy estimation problem, sometimes the symmetry of the system Hamiltonian is additionally considered and maintained in the circuit assumption, which may greatly improve the approximation effect. This requires that both an input state of the VQE and a quantum gate of the VQE circuit have corresponding symmetry. For a system that introduces auxiliary bits and the variational post-selection, using an isotropic Heisenberg model with SU(2) symmetry as an example below, it is introduced that a solution shown in the present disclosure may still maintain the corresponding symmetry in a post-selection solution, that is, maintain the total spin quantum quantity $S_{tot}^2 = 0$ conserved.

When the ordinary VQE resolves the Heisenberg model problem, the ordinary VQE maintains an initial state of the input with a total spin of 0 as a series of Bell pairs:

$$|\psi_0\rangle = \prod_i^{n/2} \frac{(|01\rangle_{i,i+1} - |10\rangle_{i,i+1})}{\sqrt{2}}$$

Correspondingly, a variational circuit structure that maintains SU(2) symmetry is a series of parameterized SWAP (switching) layers, that is:

$$U = \prod_{p=1}^{P} \prod_{i=1}^{n-1} e^{i\theta_{pi} SWAP_{i,i+1}}$$

U is a variational circuit, P represents the quantity of SWAP layers, n is the quantity of grids of the physical system, θ is a series of circuit parameters, and definition of a SWAP two-bit gate is:

$$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

Figure 6:
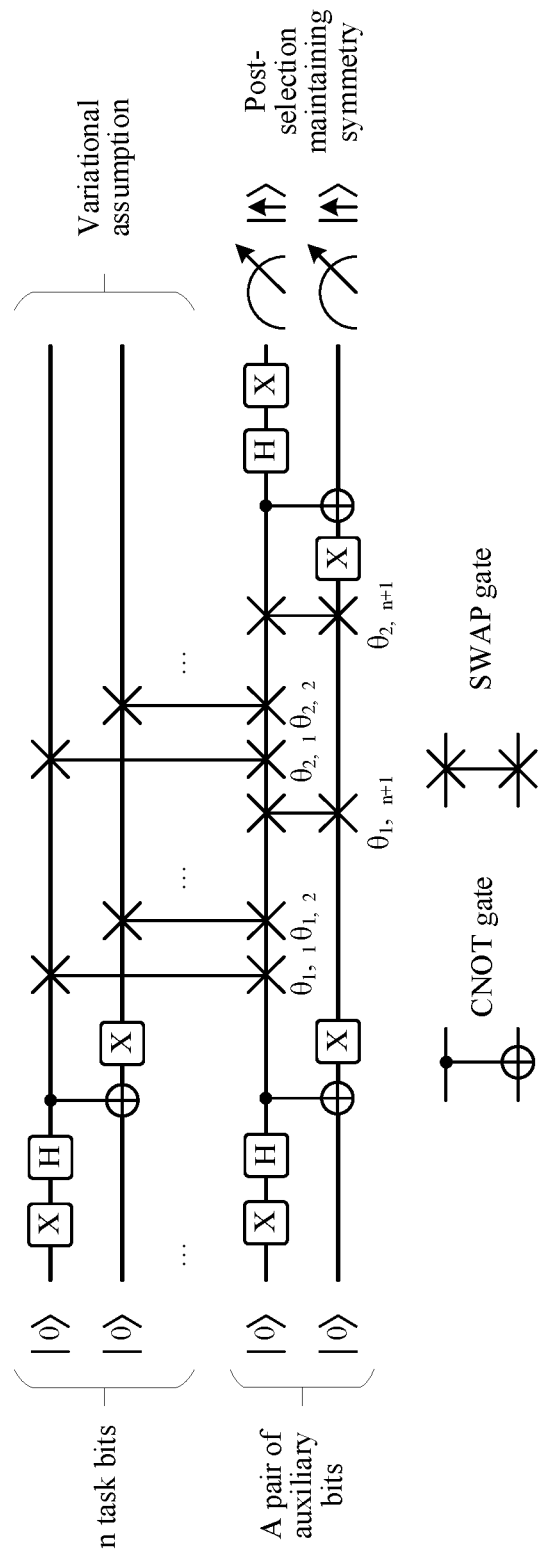
FIG. 6 is a structural diagram of a variational circuit maintaining symmetry involved in the embodiment shown in FIG. 4.

For the post-selection case of introducing auxiliary bits, additional even auxiliary bits need to be introduced to a system of even grids because the total quantity of odd spin ½ degrees of freedom does not include a representation subspace with a total spin of 0. A circuit part may maintain symmetry by using a parameterized SWAP layer. During post-selection, the Bell pair with a total spin of 0 needs to be post-selected on the auxiliary bits, so that the remaining physical system still has a total spin of 0. FIG. 6 is a structural diagram of a variational circuit maintaining symmetry involved in an embodiment of the present disclosure. As shown in FIG. 6, X is a Pauli X gate, H is a Hadamard gate, and the two two-bit gates are a CNOT gate and a parameterized SWAP gate.

The variational circuit structure shown in FIG. 6 in this embodiment of the present disclosure is an exemplary circuit structure provided under the condition that the target quantum computing task has a symmetry requirement. In some embodiments, under the condition that the target quantum computing task has the symmetry requirement, other circuit structures satisfying the symmetry requirement may also be used.

In addition, in the variational circuit structure of the PQC provided in this embodiment of the present disclosure, the quantity of auxiliary bits is not limited to an even number. For example, in a target quantum computing task that does not require symmetry, the quantity of auxiliary bits may be even or odd. Correspondingly, the variational circuit structure is not limited to a circuit structure with symmetry.

In one embodiment, the m auxiliary bits include at least one first auxiliary bit; the at least one first auxiliary bit and physical qubits corresponding to the n task bits respectively form a one-dimensional ring connection topology;
  the at least one first auxiliary bit and the n task bits are connected through a first two-bit gate layer;
  the first two-bit gate layer includes a parameterized SWAP gate between every two adjacent qubits in the at least one first auxiliary bit and the n task bits; and the parameterized SWAP gate between every two adjacent qubits is arranged in a gradient manner in the at least one first auxiliary bit and the n task bits.

In one embodiment, the m auxiliary bits further include at least one second auxiliary bit; the at least one second auxiliary bit and the at least one first auxiliary bit are connected through two SWAP gates, and a second two-bit gate layer is included between the two SWAP gates; and the second two-bit gate layer includes a parameterized SWAP gate between every two adjacent qubits in the at least one first auxiliary bit and n task bits.

In this embodiment of the present disclosure, a case of the quantum hardware bit connection is considered in a one-dimensional ring topology, and resources of the post-selection solution is described on the real hardware topology connection. The case may easily occur when selecting a better-performing one-dimensional subsystem from a two-dimensional superconducting qubit array for experiments.

For the conventional VQE solution, the gradient two-bit gate arrangement is considered, that is, pins of the two-bit gate sequentially are (1, 2), (2, 3), (3, 4). Then two-bit quantum gate resources consumed by each two-bit gate layer are exactly the same as a size n of the quantum system. For the post-selection enhanced VQE that introduces an auxiliary bit, the corresponding two-bit gate connection is that all task bits are respectively connected to the auxiliary bit. It seems that the connection requires consumption of a plurality of extra quantum gates after considering the bit topology of the quantum hardware. But in fact, in a case of the one-dimensional ring connection topology, the quantity of two-bit quantum gates required by the post-selection solution is the same as that of the conventional VQE. A basic approach is: after the auxiliary bit and the first task bit are entangled by the parameterized two-bit gate, a switching gate SWAP is simultaneously applied to the auxiliary bit and a first task bit, so that the auxiliary bit is equivalently shifted backward by one bit. In this case, the auxiliary bit is naturally adjacent to a second task bit. Correspondingly, a parameterized two-bit gate and a switching gate may be used between the auxiliary bit and the second task bit in this case, and so on, until the auxiliary bit returns to an original position after completing a whole layer of VQE circuits.

Figure 7:
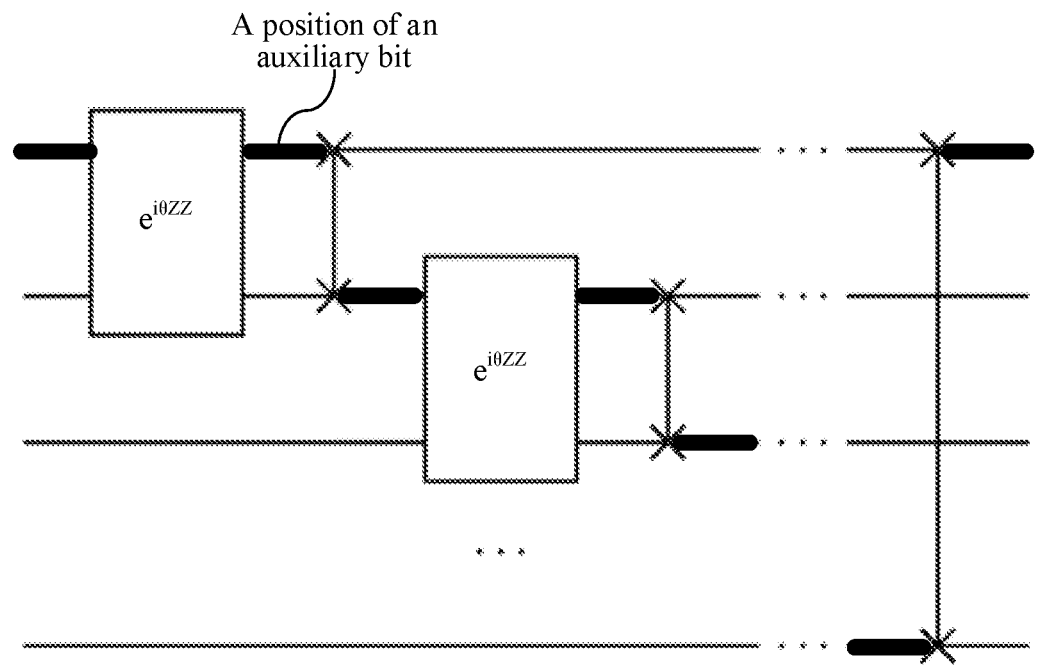
FIG. 7 is a schematic diagram of a VQE circuit involved in the embodiment shown in FIG. 4.

FIG. 7 is a schematic diagram of a VQE circuit involved in an embodiment of the present disclosure. As shown in FIG. 7, a bolded circuit indicates a position of the auxiliary bit. During the execution the whole layer of the VQE circuits, because the parameterized two-bit gate and the corresponding switching gate have the same bit pins, the parameterized two-bit gate and the corresponding switching gate may be combined and compiled into a general two-bit gate to be applied. Therefore, the two-bit quantum gates consumed by each layer of VQE circuits are still N, and the requirement for quantum resources is the same as that of the general VQE. For a case in which the VQE requires symmetry protection of even auxiliary bits, only the first auxiliary bit needs to be exchanged once, and the second auxiliary bit may be kept in place according to an N-to-1 connection manner in FIG. 6.

In the solution provided in this embodiment of the present disclosure, execution of qubits is introduced by using only an example in which the first auxiliary bit and the physical qubits corresponding to the n task bits respectively form a one-dimensional ring connection topology. In some embodiments, the quantum circuit involved in this embodiment of the present disclosure may also be executed on the quantum computing device with other connection topologies (for example, mesh topology, or the like).

A key point of this embodiment of the present disclosure is to change the space (quantity of bits) for time (circuit depth) by introducing the auxiliary bits and a variational post-selection module, thereby increasing the expression capability assumed by the PQC, and causing the PQC to have better expression capability and approximation effect in the variational task. Using the VQE task as an example, for the conventional VQE solution, the quantity of qubits used is the same as a scale of the to-be-approximated quantum system. Through the variational post-selection enhanced VQE constructed in this embodiment of the present disclosure, more qubits in the quantum system corresponding to the task bits are used for constructing the PQC, and post-selection is performed on the redundant auxiliary bits when outputting. Because there is a variational circuit module on the auxiliary bits before the post-selection, without loss of generality, the post-selected bit string whose auxiliary bits are all 0 may be selected, and a result of the post-selected measurement result on the task bit is used as the estimation of the system energy. An energy result optimized in the manner is generally lower (that is, better) than that of the conventional VQE.

Using the solution shown in this embodiment of the present disclosure applicable to the post-selection enhanced VQE solution as an example, in this embodiment of the present disclosure, the solution is applicable to ground state energy solution of a two-dimensional transverse field Ising model and a two-dimensional Heisenberg model, both obtain better energy estimation than the general VQE using almost the same quantity of quantum gates, and values are as follows.

Case 1: The Effect of a Two-Dimensional Square Grid Transverse Field Ising Model.

A transverse field Ising model with a periodic boundary condition on a two-dimensional square grid with a size of 4*3 is considered. The Hamiltonian is:

$$H = \sum_{\langle ij \rangle} Z_i Z_j - \sum_i X_i$$

<ij> represents the nearest neighbor pair ij on the square grid. $Z_i$ represents a Pauli Z matrix on a grid point i, and $X_i$ represents a Pauli X matrix on the grid point i; and the strict ground state energy for the model is: −18.914.

The one-dimensional ring quantum hardware topology is used, and the corresponding circuit is assumed to be a Hadamard gate layer plus a ZZ layer and an RX layer of a P layer, where two-bit gates included in the ZZ layer are arranged in a gradient manner (1, 2), (2, 3), ... in the manner of the nearest neighbor. A mathematical expression for a corresponding variational circuit U is:

$$U = \prod_{p=1}^{P} (\prod_{i=1}^{N-1} e^{i\theta_{pi1} Z_i Z_{i+1}} e^{i\theta_{pi2} X_i}) \prod_{i=1}^{N} H_i$$

$H_i$ is a Hadamard gate applied on the $i^{th}$ qubit, and the matrix is expressed as:

$$H = \frac{1}{\sqrt{2}} \begin{pmatrix} 1 & 1 \\ 1 & -1 \end{pmatrix}$$

For the general VQE of P=2, 3, and 4 layers, the given energy estimations are: −14.81, −15.41, and −15.62 respectively.

For a case in which an auxiliary bit is correspondingly introduced, and the arrangement of the corresponding two-bit ZZ layer is the connection of all task bits with auxiliary bits. Results of P=2, 3, and 4 layers are: −18.59, −18.67, and −18.80 respectively. In this case, the circuit assumes that a variational post-processing part V is a parameterized single-bit rotation. A result is summarized in Table 1 below.

TABLE 1

Comparison of the effects of a transverse field ising model

| Circuit depth (layers) | 2 | 3 | 4 |
|---|---|---|---|
| Ordinary VQE | −14.81 | −15.41 | −15.62 |
| Post-selection enhanced VQE | −18.59 | −18.67 | −18.80 |

Case 2: The Effect on a Two-Dimensional Square Grid Heisenberg Model.

A periodic boundary condition Heisenberg model on a two-dimensional 4*3 square grid is considered, and the corresponding system Hamiltonian is:

$$H = \sum_{\langle ij \rangle} X_i X_j + Y_i Y_j + Z_i Z_j$$

<ij> represents the adjacent grids on the square grid, and $Y_i$ represents the Pauli Y matrix on the grid i. The model has SU(2) symmetry. Therefore, the variational circuit assumption that is used is the form of a Bell pair initial state and P layers of parameterized SWAP layers that is inputted. That is, the post-selection solution that maintains symmetry and circuit assumption in the solution are adopted to be applied to the Heisenberg model. The strict ground state energy of the model is: −29.473.

If a SWAP layer of the two-bit gate is arranged in a one-dimensional periodic gradient manner, corresponding to P=2, 3, and 4 layers, the energy given by the ordinary VQE maintaining symmetry is: −25.57, −28.29, and −28.85.

If the post-selection solution with two auxiliary bits that may also maintain symmetry is adopted, the energy estimation corresponding to the circuit depths P=2, 3, and 4 are: −25.80, −28.36, and −29.05 respectively. A corresponding energy curved surface of the Heisenberg model optimization problem is relatively irregular. Both the general VQE and the post-selection enhanced VQE usually require dozens or even hundreds of independent optimizations of different initialization parameters before a set of ideal solutions may be found. In the present disclosure, a VQE result that post-selection is not performed and a VQE result that post-selection after breaking symmetry is performed are further compared, which are summarized in Table 2. Results in Table 2 fully describe the importance of the post-selection solution maintaining symmetry.

TABLE 2

Energy estimation for different VQE solutions for the Heisenberg model

| Circuit depth (layers) | 2 | 3 | 4 |
|---|---|---|---|
| Ordinary VQE | −25.57 | −28.89 | −28.85 |
| VQE with auxiliary bits (post-selection maintaining symmetry) | −25.8 | −28.36 | −29.05 |
| VQE with auxiliary bits (post-selection after breaking symmetry) | −20.98 | −23.49 | −24.78 |
| VQE with auxiliary bits (not performing post-selection) | −24.27 | −26.65 | −28.50 |

The solution shown in this embodiment has abundant examples, which may indicate from theoretical and practical problems that the post-selection enhanced VQE gives better energy estimation than the general VQE does, and the quantum hardware resources consumed are basically the same.

Examples in this embodiment of the present disclosure only use the VQE task as an example for description, and example solutions shown in this embodiment of the present disclosure may further be applicable to other variational tasks.

In summary, through the solutions shown in this embodiment of the present disclosure, for the PQC corresponding to the variational task, the m auxiliary bits are added based on the n task bits. During processing the variational task, by performing post-selection on a measurement result of the output quantum states of the m auxiliary bits, the output quantum states that satisfy a condition on the n task bits are selected to update the PQC or obtain a task result; and that is, the foregoing solution may simulate a quantum system with a physical qubit scale of n by using the m+n qubits, which improves the simulation effect of the PQC on the quantum system, thereby improving the expression capability of the PQC of the variational task, and further improving the execution effect of the variational task.

Figure 8:
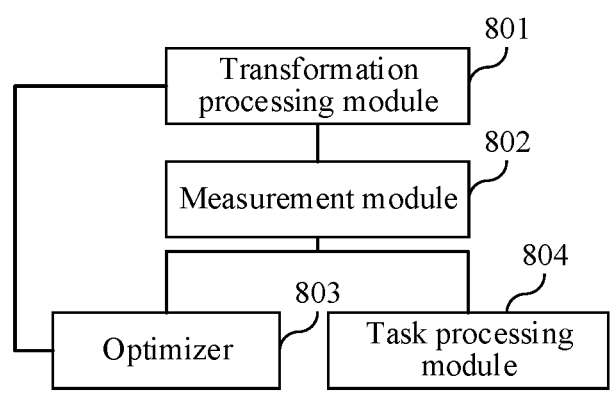
FIG. 8 is a block diagram of a quantum computing task processing system according to an embodiment of the present disclosure.

FIG. 8 is a block diagram of a quantum computing task processing system according to an embodiment of the present disclosure. The system has a function of implementing an example of the quantum computing task processing method. As shown in FIG. 8, the system may include: a transformation processing module 801, a measurement module 802, an optimizer 803, and a task processing module 804;

the transformation processing module 801 is configured to perform transformation processing on input quantum states of n+m qubits through a parameterized quantum circuit corresponding to a target quantum computing task, the n+m qubits including n task bits and m auxiliary bits, and n and m being positive integers;

the measurement module 802 is configured to measure output quantum states of the n+m qubits to obtain a bit string of the n+m qubits;

the optimizer 803 is configured to update parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and the task processing module 804 is configured to obtain a computing result of the target quantum computing task based on the output quantum states of the n task bits when the auxiliary substring in the bit string satisfies the post-selection condition and the parameterized quantum circuit has converged.

In one embodiment, the system further includes:
a post-selection module, configured to determine that the auxiliary substring in the bit string satisfies the post-selection condition when the auxiliary substring in the bit string is a target string.

In one embodiment, the parameters of the parameterized quantum circuit include parameters for performing variational transformation on quantum states of the n+m qubits.

In one embodiment, the target quantum computing task includes a ground state energy solution task; and the optimizer is configured to update the parameters of the parameterized quantum circuit according to an expected energy value of Hamiltonian of a target quantum system in the output quantum states of the n task bits when the auxiliary substring in the bit string satisfies the post-selection condition and the parameterized quantum circuit has not converged; and the task processing module is configured to obtain the expected energy value of the Hamiltonian as ground state energy of the target quantum system when the auxiliary substring in the bit string satisfies the post-selection condition and the parameterized quantum circuit has converged.

In one embodiment, the parameterized quantum circuit includes parametric entangling gates between the n task bits and the m auxiliary bits respectively.

In one embodiment, the m auxiliary bits include at least one first auxiliary bit; the at least one first auxiliary bit and physical qubits corresponding to the n task bits respectively form a one-dimensional ring connection topology;

the at least one first auxiliary bit and the n task bits are connected through a first two-bit gate layer;

the first two-bit gate layer includes a parameterized SWAP gate between every two adjacent qubits in the at least one first auxiliary bit and the n task bits; and the parameterized SWAP gate between every two adjacent qubits is arranged in a gradient manner in the at least one first auxiliary bit and the n task bits.

In one embodiment, the m auxiliary bits further include at least one second auxiliary bit; the at least one second auxiliary bit and the at least one first auxiliary bit are connected through two SWAP gates, and a second two-bit gate layer is included between the two SWAP gates; and the second two-bit gate layer includes the parameterized SWAP gate between every two adjacent qubits in the at least one first auxiliary bit and the n task bits.

In one embodiment, an input quantum state of the parameterized quantum circuit and a quantum gate in the parameterized quantum circuit have symmetry.

In one embodiment, when the target quantum computing task is a task with a symmetry requirement, the m auxiliary bits include at least two pairs of auxiliary bits, and m is an even number; and a total spin of an output quantum state of each of the at least two pairs of auxiliary bits is zero.

According to an aspect of this embodiment of the present disclosure, a computer device is provided, the computer program device being configured to perform the quantum computing task processing method as described above.

In summary, through the solutions shown in this embodiment of the present disclosure, for the PQC corresponding to the variational task, the m auxiliary bits are added based on the n task bits. During processing the variational task, by performing post-selection on a measurement result of the output quantum states of the m auxiliary bits, the output quantum states that satisfy a condition on the n task bits are selected to update the PQC or obtain a task result; and that is, the foregoing solution may simulate a quantum system with a physical qubit scale of n by using the m+n qubits, which improves the simulation effect of the PQC on the quantum system, thereby improving the expression capability of the PQC of the variational task, and further improving the execution effect of the variational task.

When the system provided in the foregoing embodiments implements functions of the apparatus, it is illustrated with an example of division of each functional module. In the practical application, the function distribution may be finished by different functional modules according to the requirements, that is, the internal structure of the device is divided into different functional modules, to implement all or some of the functions described above. In addition, the system and method embodiments provided in the foregoing embodiments belong to one conception. For the specific implementation process, refer to the method embodiments, and details are not described herein again.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an exemplary embodiment of the present disclosure, a computer device is further provided. The computer device may be a hybrid computer device including a classical computer and a quantum computer; and the computer device may be configured to perform the quantum computing task processing method provided in the embodiment shown in FIG. 2 or FIG. 4.

Figure 9:
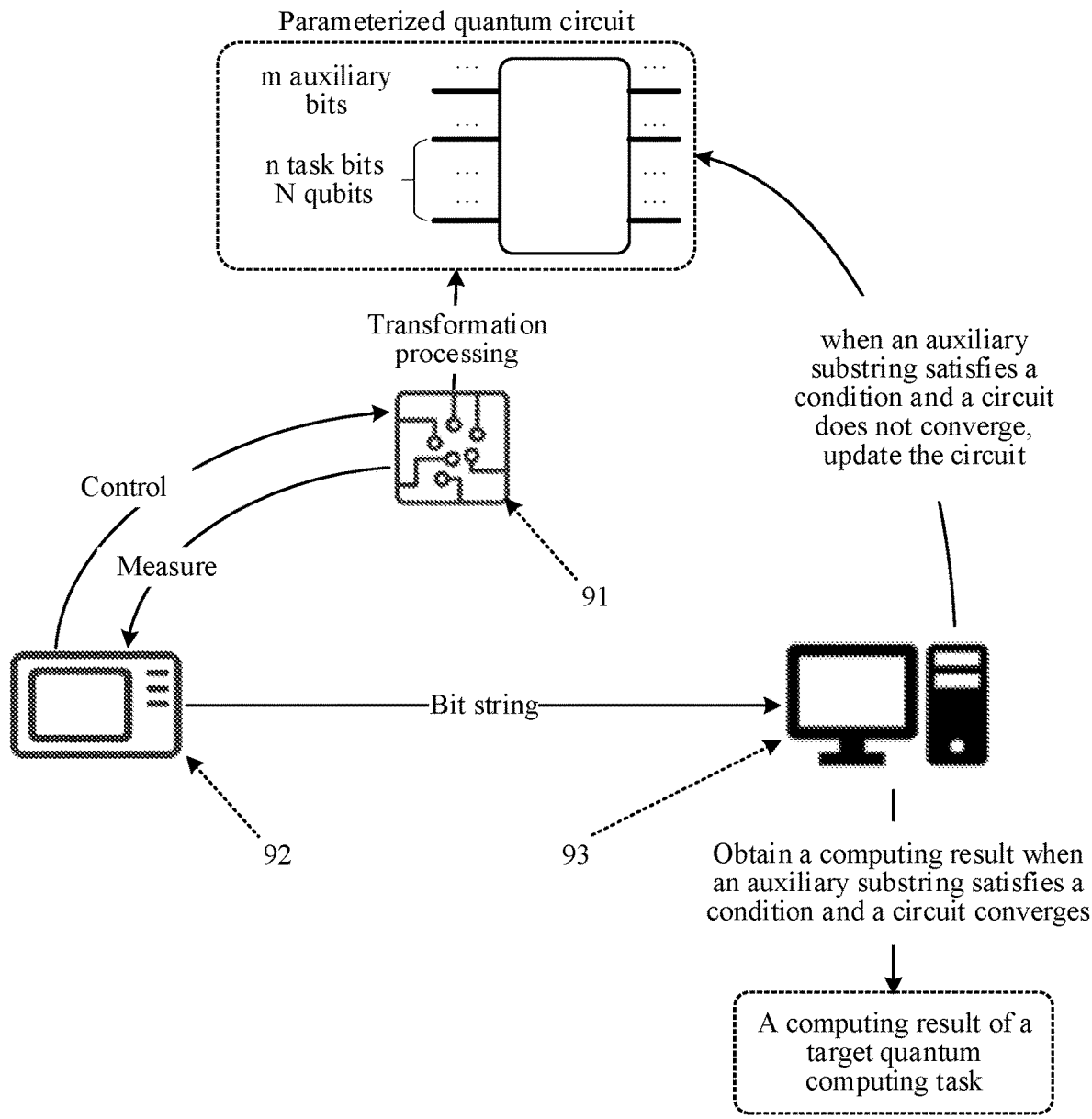
FIG. 9 is a block diagram of a quantum computing task processing system according to an embodiment of the present disclosure.

In an exemplary embodiment of the present disclosure, a hybrid computer system is further provided. FIG. 9 is a block diagram of a quantum computing task processing system according to an embodiment of the present disclosure. The system includes a quantum computing device 91, a control device 92, and a classical computer 93;

the control device 92 is configured to control the quantum computing device 91 to execute a parameterized quantum circuit corresponding to a target quantum computing task, so as to perform transformation processing on input quantum states of n+m qubits, the n+m qubits including n task bits and m auxiliary bits. n and m being positive integers;

the control device 92 is configured to measure output quantum states of the n+m qubits to obtain a bit string of the n+m qubits;

the classical computer 93 is configured to update parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and the classical computer 93 is further configured to obtain a computing result of the target quantum computing task based on the output quantum states of the n task bits when the auxiliary substring in the bit string satisfies the post-selection condition and the parameterized quantum circuit has converged.

In one embodiment, the classical computer 93 is further configured to determine that the auxiliary substring in the bit string satisfies the post-selection condition when the auxiliary substring in the bit string is a target string.

In one embodiment, the parameters of the parameterized quantum circuit include parameters for performing variational transformation on quantum states of the n+m qubits.

In one embodiment, the target quantum computing task includes ground state energy solution task; and the classical computer 93 is configured to update the parameters of the parameterized quantum circuit according to an expected energy value of Hamiltonian of a target quantum system in the output quantum states of the n task bits when the auxiliary substring in the bit string satisfies the post-selection condition and the parameterized quantum circuit has not converged; and the classical computer 93 is further configured to obtain the expected energy value of the Hamiltonian as ground state energy of the target quantum system when the auxiliary substring in the bit string satisfies the post-selection condition and the parameterized quantum circuit has converged.

In one embodiment, the parameterized quantum circuit includes parametric entangling gates between the n task bits and the m auxiliary bits respectively.

In one embodiment, the m auxiliary bits include at least one first auxiliary bit; the at least one first auxiliary bit and physical qubits corresponding to the n task bits respectively form a one-dimensional ring connection topology;
  the at least one first auxiliary bit and the n task bits are connected through a first two-bit gate layer;
  the first two-bit gate layer includes a parameterized SWAP gate between every two adjacent qubits in the at least one first auxiliary bit and the n task bits; and the parameterized SWAP gate between every two adjacent qubits is arranged in a gradient manner in the at least one first auxiliary bit and the n task bits.

In one embodiment, the m auxiliary bits further include at least one second auxiliary bit; the at least one second auxiliary bit and the at least one first auxiliary bit are connected through two SWAP gates, and a second two-bit gate layer is included between the two SWAP gates; and
  the second two-bit gate layer includes a parameterized SWAP gate between every two adjacent qubits in the at least one first auxiliary bit and the n task bits; and In one embodiment, an input quantum state of the parameterized quantum circuit and a quantum gate in the parameterized quantum circuit have symmetry when the target quantum computing task is a task with a symmetry requirement.

In one embodiment, the m auxiliary bits include at least two pairs of auxiliary bits, and m is an even number; and
  a total spin of an output quantum state of each of the at least two pairs of auxiliary bits is zero.

In an exemplary embodiment, one or more computer-readable storage media is further provided, the computer-readable storage media storing one or more computer programs, the one or more computer programs, when executed by a computer device, cause the computer device to execute quantum computing task processing method as described above. The computer device may be a hybrid device that includes a classical computer and a quantum computer.

In some embodiments, the computer-readable storage media may include: a read-only memory (ROM), a random-access memory (RAM), a solid state drive (SSD), an optical disc, or the like. The RAM may include a resistance random access memory (ReRAM) and a dynamic random access memory (DRAM).

In summary, through the solutions shown in this embodiment of the present disclosure, for the PQC corresponding to the variational task, the m auxiliary bits are added based on the n task bits. During processing the variational task, by performing post-selection on a measurement result of the output quantum states of the m auxiliary bits, the output quantum states that satisfy a condition on the n task bits are selected to update the PQC or obtain a task result; and that is, the foregoing solution may simulate a quantum system with a physical qubit scale of n by using the m+n qubits, which improves the simulation effect of the PQC on the quantum system, thereby improving the expression capability of the PQC of the variational task, and further improving the execution effect of the variational task.

It is to be understood that "plurality of" mentioned in the specification means two or more. "And/or" describes an association relationship for describing associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A quantum computing task processing method, performed by a hybrid computer device comprising a classical computer and a quantum computer; and the method comprising:
  performing transformation processing on input quantum states of n+m qubits through a parameterized quantum circuit corresponding to a target quantum computing task, the n+m qubits comprising n task bits and m auxiliary bits, and n and m being positive integers;
  measuring output quantum states of the n+m qubits to obtain a bit string of the n+m qubits;
  updating parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and
  obtaining a computing result of the target quantum computing task based on the output quantum states of the n task bits when the auxiliary substring in the bit string satisfies the post-selection condition and the parameterized quantum circuit has converged.

2. The method according to claim 1, further comprising:
  determining that the auxiliary substring in the bit string satisfies the post-selection condition when the auxiliary substring in the bit string is a target string.

3. The method according to claim 1, wherein the parameters of the parameterized quantum circuit comprise parameters for performing variational transformation on quantum states of the n+m qubits.

4. The method according to claim 3, wherein the target quantum computing task comprises ground state energy solution task.

5. The method according to claim 4, wherein the updating parameters of the parameterized quantum circuit based on output quantum states of the n task bits when an auxiliary substring in the bit string satisfies a post-selection condition and the parameterized quantum circuit has not converged comprises:

updating the parameters of the parameterized quantum circuit according to an expected energy value of Hamiltonian of a target quantum system in the output quantum states of then task bits when the auxiliary substring in the bit string satisfies the post-selection condition and the parameterized quantum circuit has not converged.

6. The method according to claim 4, wherein the obtaining a computing result of the target quantum computing task based on the output quantum states of the n task bits when the auxiliary substring in the bit string satisfies a post-selection condition and the parameterized quantum circuit has converged comprises:
obtaining the expected energy value of the Hamiltonian as ground state energy of the target quantum system when the auxiliary substring in the bit string satisfies the post-selection condition and the parameterized quantum circuit has converged.

7. A hybrid computer system comprising:
a quantum computing device including a parameterized quantum circuit, a control device, and a classical computer, wherein:
the control device is configured to control the quantum computing device to execute the parameterized quantum circuit corresponding to a target quantum computing task, so as to perform transformation processing on input quantum states of n+m qubits, the n+m qubits comprising n task bits and m auxiliary bits, and n and m being positive integers;
the control device is configured to measure output quantum states of the n+m qubits to obtain a bit string of the n+m qubits;
the classical computer is configured to update parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and
the classical computer is further configured to obtain a computing result of the target quantum computing task based on the output quantum states of the n task bits when the auxiliary substring in the bit string satisfies the post-selection condition and the parameterized quantum circuit has converged.

8. The system according to claim 7, wherein the classical computer is further configured to determine that the auxiliary substring in the bit string satisfies the post-selection condition when the auxiliary substring in the bit string is a target string.

9. The system according to claim 7, wherein the parameters of the parameterized quantum circuit comprise parameters for performing variational transformation on quantum states of the n+m qubits.

10. The system according to claim 9, wherein the target quantum computing task comprises a ground state energy solution task; and
the classical computer is configured to update the parameters of the parameterized quantum circuit according to an expected energy value of Hamiltonian of a target quantum system in the output quantum states of the n task bits when the auxiliary substring in the bit string satisfies the post-selection condition and the parameterized quantum circuit has not converged; and
the classical computer is further configured to obtain the expected energy value of the Hamiltonian as ground state energy of the target quantum system when the auxiliary substring in the bit string satisfies the post-selection condition and the parameterized quantum circuit has converged.

11. The system according to claim 7, wherein the parameterized quantum circuit comprises parametric entangling gates between the n task bits and the m auxiliary bits respectively.

12. The system according to claim 11, wherein the m auxiliary bits comprise at least one first auxiliary bit; the at least one first auxiliary bit and physical qubits corresponding to the n task bits respectively form a one-dimensional ring connection topology;
the at least one first auxiliary bit and the n task bits are connected through a first two-bit gate layer;
the first two-bit gate layer comprises a parameterized SWAP gate between two adjacent qubits in the at least one first auxiliary bit and the n task bits; and the parameterized SWAP gate between two adjacent qubits is arranged in a gradient manner in the at least one first auxiliary bit and the n task bits.

13. The system according to claim 12, wherein the m auxiliary bits further comprise at least one second auxiliary bit; the at least one second auxiliary bit and the at least one first auxiliary bit are connected through two SWAP gates, and a second two-bit gate layer is comprised between the two SWAP gates; and
the second two-bit gate layer comprises the parameterized SWAP gate between two adjacent qubits in the at least one first auxiliary bit and the n task bits.

14. The system according to claim 7, wherein an input quantum state of the parameterized quantum circuit and a quantum gate in the parameterized quantum circuit have symmetry when the target quantum computing task is a task with a symmetry requirement.

15. The system according to claim 14, wherein the m auxiliary bits comprise at least two pairs of auxiliary bits, and m is an even number; and
a total spin of an output quantum state of each pair of the at least two pairs of auxiliary bits is zero.

16. One or more non-transitory computer-readable storage media, storing one or more computer programs, the one or more computer programs, when loaded and executed by a computer device, causing the computer device to implement:
performing transformation processing on input quantum states of n+m qubits through a parameterized quantum circuit corresponding to a target quantum computing task, the n+m qubits comprising n task bits and m auxiliary bits, and n and m being positive integers;
measuring output quantum states of the n+m qubits to obtain a bit string of the n+m qubits;
updating parameters of the parameterized quantum circuit based on output quantum states of the n task bits when an auxiliary substring in the bit string satisfies a post-selection condition and the parameterized quantum circuit has not converged, the auxiliary substring being a substring corresponding to the m auxiliary bits in the bit string; and
obtaining a computing result of the target quantum computing task based on the output quantum states of the n task bits when the auxiliary substring in the bit string satisfies the post-selection condition and the parameterized quantum circuit has converged.

17. The storage media according to claim 16, wherein the one or more computer programs further cause the computer device to implement:

determining that the auxiliary substring in the bit string satisfies the post-selection condition when the auxiliary substring in the bit string is a target string.

18. The storage media according to claim 16, wherein the parameters of the parameterized quantum circuit comprise parameters for performing variational transformation on quantum states of the n+m qubits.

19. The storage media according to claim 18, wherein the target quantum computing task comprises ground state energy solution task.

20. The storage media according to claim 19, wherein:
the updating parameters of the parameterized quantum circuit based on output quantum states of the n task bits when an auxiliary substring in the bit string satisfies a post-selection condition and the parameterized quantum circuit has not converged comprises:
updating the parameters of the parameterized quantum circuit according to an expected energy value of Hamiltonian of a target quantum system in the output quantum states of then task bits when the auxiliary substring in the bit string satisfies the post-selection condition and the parameterized quantum circuit has not converged; and the obtaining a computing result of the target quantum computing task based on the output quantum states of the n task bits when the auxiliary substring in the bit string satisfies a post-selection condition and the parameterized quantum circuit has converged comprises:

obtaining the expected energy value of the Hamiltonian as ground state energy of the target quantum system when the auxiliary substring in the bit string satisfies the post-selection condition and the parameterized quantum circuit has converged.

\* \* \* \* \*